United States Patent [19]

Bonner et al.

[11] 4,037,122
[45] July 19, 1977

[54] LINEAR ACTUATOR

[75] Inventors: Gilbert Belmont Bonner; Joseph Leo Dessel, both of Endicott, N.Y.

[73] Assignee: International Business Machines Corporation, Armonk, N.Y.

[21] Appl. No.: 691,931

[22] Filed: June 1, 1976

[51] Int. Cl.² .................................... H02K 33/00
[52] U.S. Cl. ......................... 310/14; 310/12; 310/30; 318/136
[58] Field of Search ................. 310/12–14, 310/49, 28, 30; 318/135, 121, 687, 37, 38

[56] References Cited

U.S. PATENT DOCUMENTS

| | | |
|---|---|---|
| 3,265,911 | 8/1966 | Madsen .................................. 310/12 |
| 3,268,747 | 8/1966 | Snowdon ................................ 310/13 |
| 3,292,065 | 12/1966 | Frederickson ..................... 310/12 X |
| 3,867,676 | 2/1975 | Chai et al. ............................ 318/135 |

*Primary Examiner*—Donovan F. Duggan
*Attorney, Agent, or Firm*—John S. Gasper

[57] ABSTRACT

A linear actuator comprises a toothed magnetic motor bar and a motor element having a pair of E-cores on opposite sides of the motor bar. Rollers attached directly to the E-cores ride on the motor bar to maintain a fixed air gap between the motor bar and the pole faces of the E-cores. The E-cores are connected by I-shaped connector plates to hold the tooth relationship between E-cores. The connector plates also are flexible to compensate for variations in thickness of the motor bar.

6 Claims, 5 Drawing Figures

LINEAR ACTUATOR

BACKGROUND OF THE INVENTION

1. Field of the Invention

This invention relates to linear actuators and particularly to linear electric motors of the stepper type.

2. Description of the Prior Art

Linear electric motors are well known in which a magnetic toothed motor bar and a magnetic armature structure comprising magnetic core and windings interact to produce relative motion in steplike manner when windings are sequentially energized. One such linear stepper motor is described in U.S. Pat. No. 3,867,676, issued to Hi D. Chai and Joseph P. Pawletko on Feb. 18, 1975. In that patent, the linear motor has armature structures that take the form of E-cores. Each E-core has poles with toothed faces coacting with the teeth of the motor bar on opposite surfaces. The E-cores are attached to a rigid frame structure which has rollers on the upper and lower toothed surfaces of the motor bar. The frame and rollers are designed to maintain a fixed air gap between the pole faces of the E-cores and the upper and lower surfaces of the motor bar. In many applications for linear stepper motors, such as for serial printers as described in copending application of Hi D. Chai and Joseph P. Pawletko, Ser. No. 676,584, filed Apr. 13, 1976, precision stepping is required. This type operation requires the alignment of the motors and air gap be very precise and be maintained without deviation under very high mechanical stresses. In the linear motor structure of the abovementioned U.S. patent, the attainment of the desired precise alignment and air gap is achieved only with very costly manufacturing procedures. Tolerance variations in the mounting of E-cores and rollers on the frame members and the parallelism of the upper and lower bar surfaces very easily destroy the desired air gap size and alignments of the E-core pole teeth thereby affecting the precision in the stepping operation of the motor.

SUMMARY OF THE INVENTION

It is an object of this invention to provide an improved linear motor.

It is a general object of this invention to provide a linear stepper motor with an improved structure which overcomes the abovementioned problems.

It is a specific object of this invention to provide an improved linear stepper motor in which the magnetic structures are capable of being maintained in precise alignment without adjustment.

It is also a specific object of this invention to provide an improved linear stepper motor in which a fixed air gap is maintained notwithstanding slight dimensional variations caused by manufacturing processes.

It is a further specific object of this invention to achieve the above objects with a linear stepper motor structure which is relatively simple to construct, assemble and maintain.

The above as well as other objects and advantages are attained in accordance with this invention by attaching the rollers directly to the magnetic cores. In this way the air gap is easily fixed relative to the guide surface of the motor bar. Further in accordance with this invention, the magnetic cores are directly connected by a support structure which automatically compensates for variations in motor bar thickness. In accordance with this invention, the support structure is designed to be relatively flexible in the vertical direction to thereby allow for variations in the thickness of the motor bar but relatively rigid in the horizontal direction to thereby maintain the alignment of the upper and lower magnetic cores very precisely. In the preferred embodiment, the support structure comprises connector plates of spring steel or the like having horizontally extending upper and lower support arms. The upper support arms are fixedly attached to the upper magnetic core while the lower arms are attached to the lower magnetic core. The arms are designed to flex when subjected to forces in the plane of the connector plate but are substantially inextensible when subjected to forces applied in the direction of motion.

The connector plates can be readily manufactured by stamping operation thereby making manufacture simple and relatively inexpensive. Because of the in-plane flexibility of the connector plates, minor variations in the thickness of the motor bar are readily compensated while holding the air gaps within precise limits. Thus, a constant magnetic force is obtained so that the actuator is capable of being precisely operated.

The foregoing and other objects, features and advantages of the invention will be apparent from the following more particular description of a preferred embodiment of the invention, as illustrated in the accompanying drawing.

DETAILED DESCRIPTION OF THE INVENTION

Figure 1:
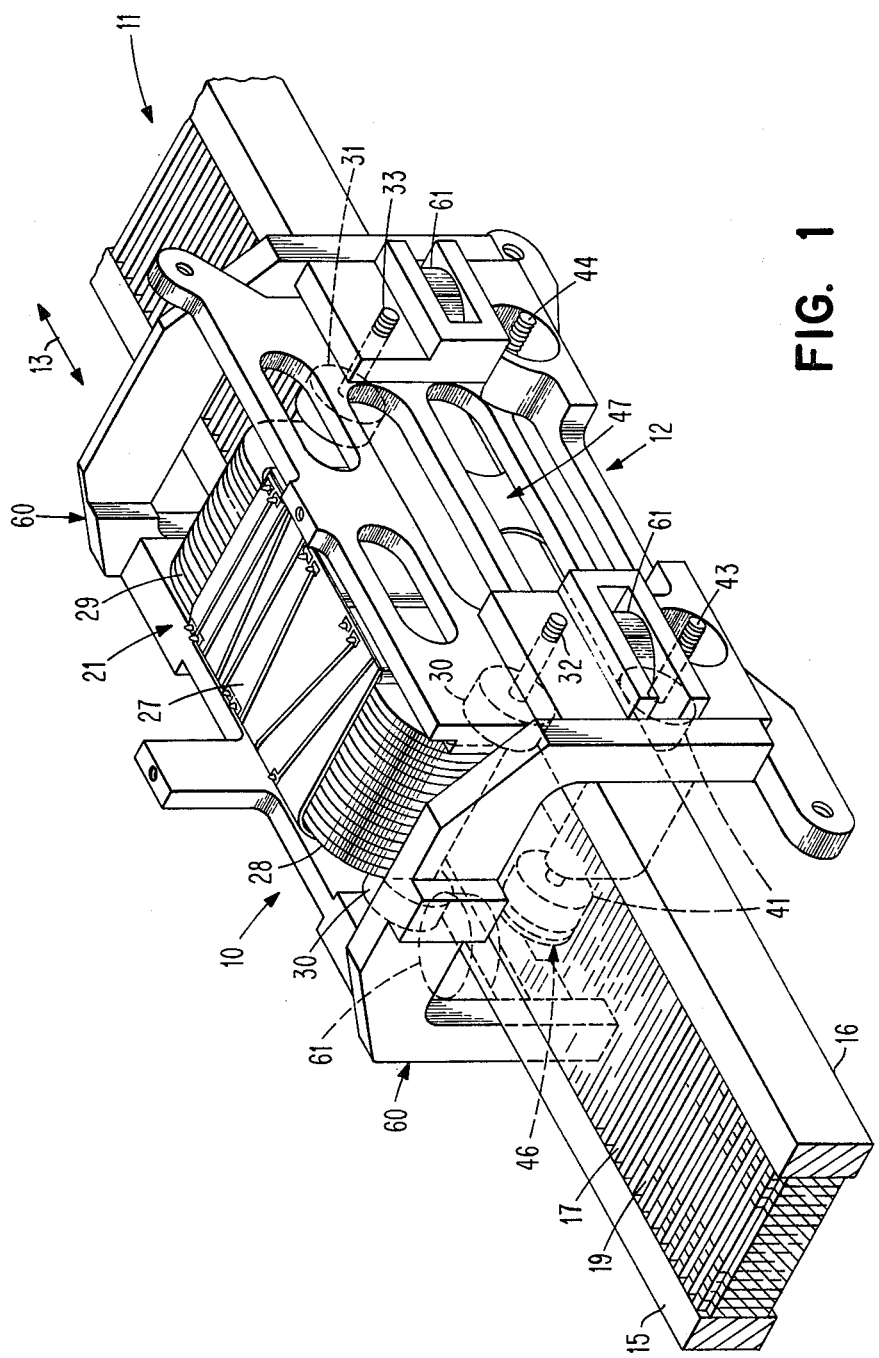
FIG. 1 is a three-dimensional view of a preferred embodiment of a linear actuator in accordance with the invention.

Referring to the drawings, a linear actuator 10 comprises a motor bar 11 and a motor element 12. In a particular application, such as shown in previously mentioned application of H. D. Chai and J. P. Pawletko, the motor bar 11 is made stationary by attachment to a base structure (not shown) and the motor element 12 is movable. Alternatively, in other uses of the invention, the motor element 12 could be made stationary by suitable means and the motor bar 11 would be movable. In either case, motion occurs in the direction of the longitudinal axis of motor bar 11 as indicated by the bidirectional arrow 13.

Motor bar 11 is preferably constructed of a plurality of laminations 14 (see FIG. 3) of magnetic material bonded together by suitable means between a pair of guide rails 15 and 16. Grooves 17 and 18 (see FIG. 2) are formed in the upper and lower parallel surfaces of the laminations 14 to form uniformly spaced teeth 19 and 20 which extend transverse to the longitudinal axis of bar 11. The teeth 19 in the upper surface of bar 11 are aligned with the teeth 20 on the bottom surface of bar 11. The guide rails 15 and 16 preferably are made of a material which has good wear properties such as steel and are designed to provide upper and lower guide surfaces for the motor element 12.

In the manufacture of the motor bar 11, the magnetic laminations 14 are first stamped with grooves 17 and 18 to form teeth 19 and 20 and then after alignment are bonded together with the rails 15 and 16 in a compact package having a thickness greater than desired. Then all four surfaces of the bar 11 are ground to the desired dimensions. It is during the grinding operation that slight variations in tolerance between the upper and lower surfaces of bar 11 may occur in the event extremely precise operations are not followed. In accordance with this invention, the motor element 12 is constructed to automatically adjust for variations in the thickness of the motor bar 11 as the motor element 12 moves along bar 11 or vice versa in the direction of arrow 13.

Figure 2:
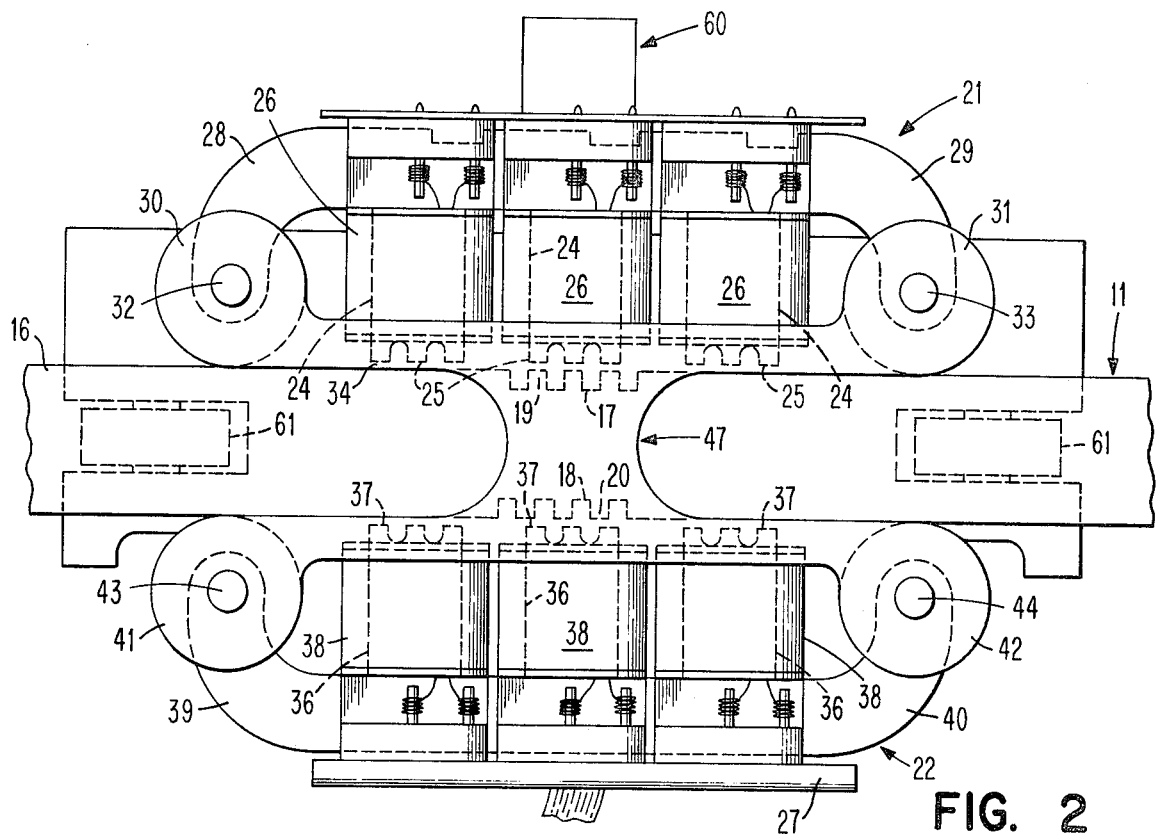
FIG. 2 is a side elevation of the linear actuator of FIG. 1 with parts of carrier frame omitted.
Figure 3:
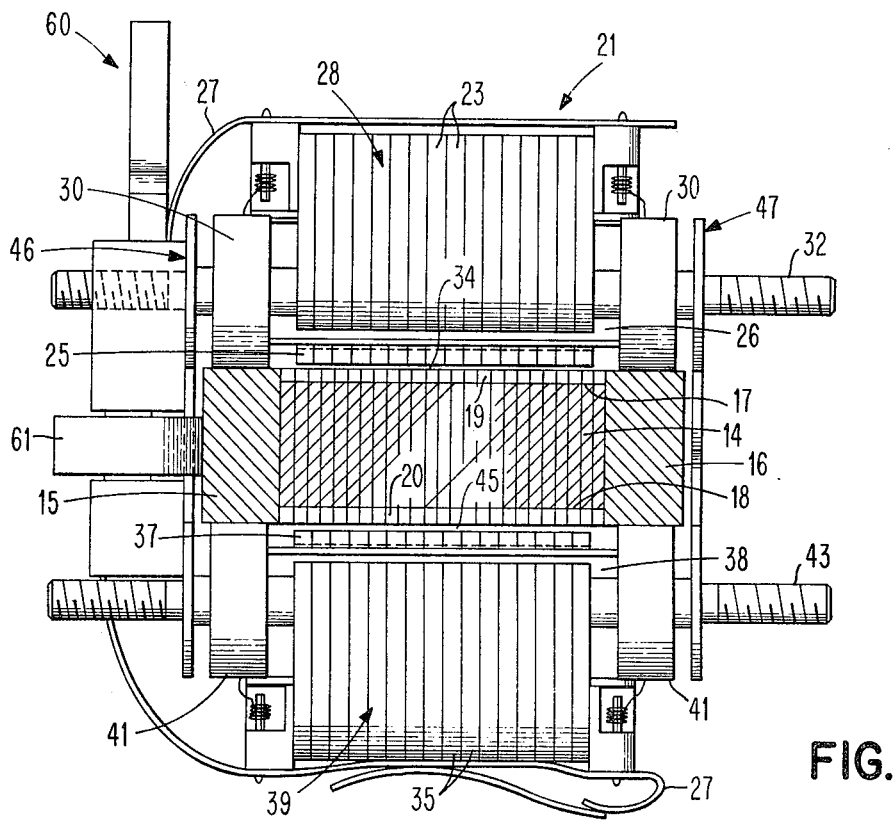
FIG. 3 is an end elevation of the linear actuator of FIG. 1 with parts of the carrier frame omitted.
Figure 4:
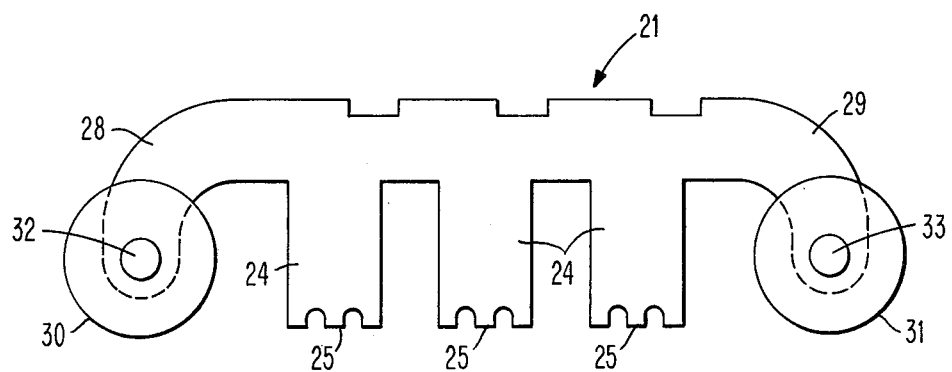
FIG. 4 shows a side elevation of one of the magnetic core structure subassembly for the motor element of this invention.

In the preferred embodiment of this invention, the motor element 12 comprises upper and lower magnetic structures which take the form of E-cores 21 and 22, respectively. As best seen in FIGS. 2-4, E-core 21 which is constructed from a plurality of laminations 23 of magnetic material, has plural poles 24 which terminate in pole faces provided wth teeth 25. Poles 24 are provided with energizing coils 26 having one or more windings which are connected to external energy source via flexible flat cable 27. At opposite ends E-core 21 has extensions 28 and 29 to which are attached two pairs of rollers 30 and 31, respectively. Rollers 30 and 31 are rotatably supported in spaced relation by shafts 32 and 33 so as to be in alignment with the upper edge of guide rails 15 and 16. Rollers 30 and 31 are precisely dimensioned and shafts 32 and 33 are precisely located on the extensions 28 and 29 so that a very precise air gap 34 is maintained between teeth 25 of poles 24 of E-core 21 and the teeth 19 on the upper surface of motor bar 11 when rollers 30 and 31 are in contact with guide rails 15 and 16.

In the same manner, E-core 22 is constructed with plural magnetic laminations 35 having plural spaced poles 36 which terminate in faces having teeth 37. Energizing coils 38 having one or more windings mounted on each pole 36 are connected to coils 26 of E-core 21 and to the external source via flat cable 27. The interconnection of windings of coils 26 and 38 of the E-cores 21 and 22 can take various forms but preferably are bifilar and are connected in series as shown in the previously mentioned U.S. patent of H. D. Chai and J. P. Pawletko.

Like E-core 21, E-core 22 has extensions 39 and 40. Two pairs of rollers 41 and 42 on shafts 43 and 44 extending from extensions 39 and 40 are spaced to ride on the bottom edge surfaces of guide rails 15 and 16. The dimensions of rollers 41 and 42, the location of shafts 43 and 44 on extensions 39 and 40 assure that a very precise air gap 45 is fixed between teeth 37 of poles 36 of E-core 22 and teeth 20 on the bottom surface of motor bar 11.

As already mentioned, the motor element 12 is constructed to automatically compensate for variations in the thickness of motor bar 11. It is also essential that the E-cores 21 and 22 be held precisely aligned relative to each other so that the teeth 25 of poles 24 be always aligned with teeth 37 of poles 36 at all times during movement. For this purpose E-core 21 is mechanically connected directly to E-22 by a pair of connector plates 46 and 47. Connector plates 46 and 47 are constructed so that they are inextensible in the longitudinal direction while being flexible in the vertical direction, i.e. the direction perpendicular to the direction of motion. Since the connector plates 46 and 47 are identical, only connector plate 46 will be described in complete detail.

Figure 5:
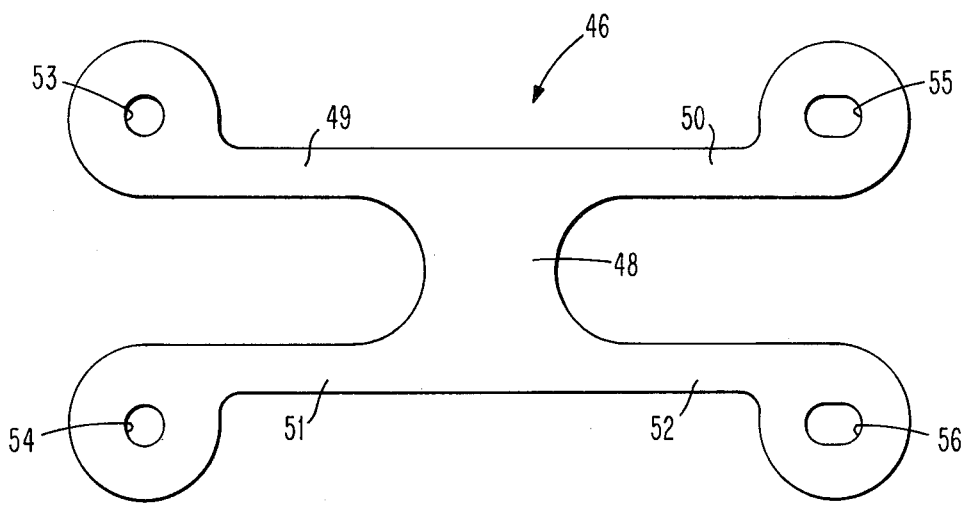
FIG. 5 is a plan view of one of the connector plates used in the invention.

Referring to FIG. 5, connector plate 46 is made from a thin sheet, preferably metal such as spring steel although other materials can be used. By using a thin sheet the connector plates 46 and 47 can be easily manufactured by a stamping operation.

While connector plates 46 and 47 can take various forms and shapes, in the preferred embodiment of this invention, they are generally I-shaped. As seen in FIG. 5, connector plate 46 has a center leg 48 from which integral upper arms 49 and 50 and lower arms 51 and 52 extend. Arms 49 and 51 have circular holes 53 and 54, respectively, for receiving and attachment to the shafts 32 and 43 of the E-cores 21 and 22. Arms 50 and 52 have elongate holes 55 and 56 which for receipt and attachment to shafts 33 and 44 of E-cores 21–22. The length of the arms 49–52 is such that some flexure occurs when torque is applied thereto. Also, sepaaration of arms 49 and 51 and 50 and 52 is chosen so that when E-cores 21 and 22 are attached thereto the space between the sets of rollers is less than the minimum thickness of the guide rails 15 and 16 of motor bar 11. Thus, due to the spring rate of arms 49–52, an initial biasing force is applied to rollers 30, 31, 41 and 42 causing them to be held in constant engagement with the guide surfaces of guide rails 15 and 16.

During operation of actuator 10, such as when windings 26 and 38 are energized, as described in the U.S. patent of H. D. Chai and J. P. Pawletko, motor element 12 moves in linear steps along bar 11. Any variations in thickness of motor bar 11 causes the rollers 30, 31, 41 and 42 to apply flexure forces to arms 49–52 during such motion. The arms 49–52 thereby compensate for tolerance variations in the thickness of bar 11 while maintaining the dimensions of air gaps 34 and 45 substantially constant.

Where the invention is used for transporting a print mechanism such as a disk printer employs, a carrier frame 60 is attached to E-core 21 preferably by attachment to the shafts 32 and 33. Rollers 61 are carried by frame 60 to make contact with the vertical sides of guide rails 15 and 16. There is no mechanical connection of frame 60 to the E-core 22 thereby allowing freedom of vertical movement relative to E-core 21 as described.

While the invention has been depicted in an arrangement in which the E-cores 21 and 22 are mounted to be guided by the upper and lower parallel surfaces of motor bar 11, it is clear that the invention could be practiced where the bar is rotated 90° from the position shown in the drawings.

While the invention has been particularly shown and described with reference to a preferred embodiment thereof, it will be understood by those skilled in the art that various changes in form and details may be made therein without departing from the spirit and scope of the invention.

We claim:

1. A linear actuator comprising in combination
   an elongate magnetic motor bar having parallel guide surfaces,
   a motor element inductively co-operable with said motor bar to produce relative motion therebetween in the direction of the longitudinal axis of said motor bar,
   said motor element comprising a first magnetic structure inductively co-operable with said motor bar to cause said relative motion, first roller means attached to said first magnetic structure, said first roller means engaging a first of said guide surfaces during said relative motion and maintaining a fixed air gap between said first magnetic structure and said guide surface, a second magnetic structure inductively co-operable with said motor bar to cause said relative motion jointly with said first magnetic structure, second roller means attached to said second magnetic structure, said second roller means engaging a second of said guide surfaces during said relative motion and maintaining a fixed air gap between said second magnetic structure and said second guide surface, and a support structure connecting said first magnetic structure to said second magnetic structure so as to maintain said first and second roller means in continuous contact with said guide surfaces, said support structure being expandable in the direction perpendicular to said direction of motion to compensate for variations in the thickness of said motor bar.

2. A linear actuator in accordance with claim 1 in which said support structure comprises a flat connector plate means having support arms attached to said first and second magnetic structures, said support arms being flexible in said direction perpendicular to said direction of motion.

3. A linear actuator in accordance with claim 2 in which said first and second magnetic structures are magnetic E-cores having plural magnetic poles spaced in the direction of motion, said E-cores having rigid extensions on either side of said poles, and said first and second roller means are supported by said extensions of said E-cores.

4. A linear actuator in accordance with claim 2 in which said connector plates are made of spring steel or the like.

5. A linear actuator in accordance with claim 2 in which said support arms have a spacing less than the thickness of said motor whereby a biasing torque is applied to maintain said first and second roller means in constant engagement with said guide surfaces.

6. A linear actuator in accordance with claim 2 in which said first and second rollers and said support arms of said connector plates are connected to common axes.

* * * * *